H. A. GOERING & S. P. KREHBIEL.
HAY RAKE AND STACKER.
APPLICATION FILED OCT. 3, 1912.
1,146,244.
Patented July 13, 1915.
3 SHEETS—SHEET 1.
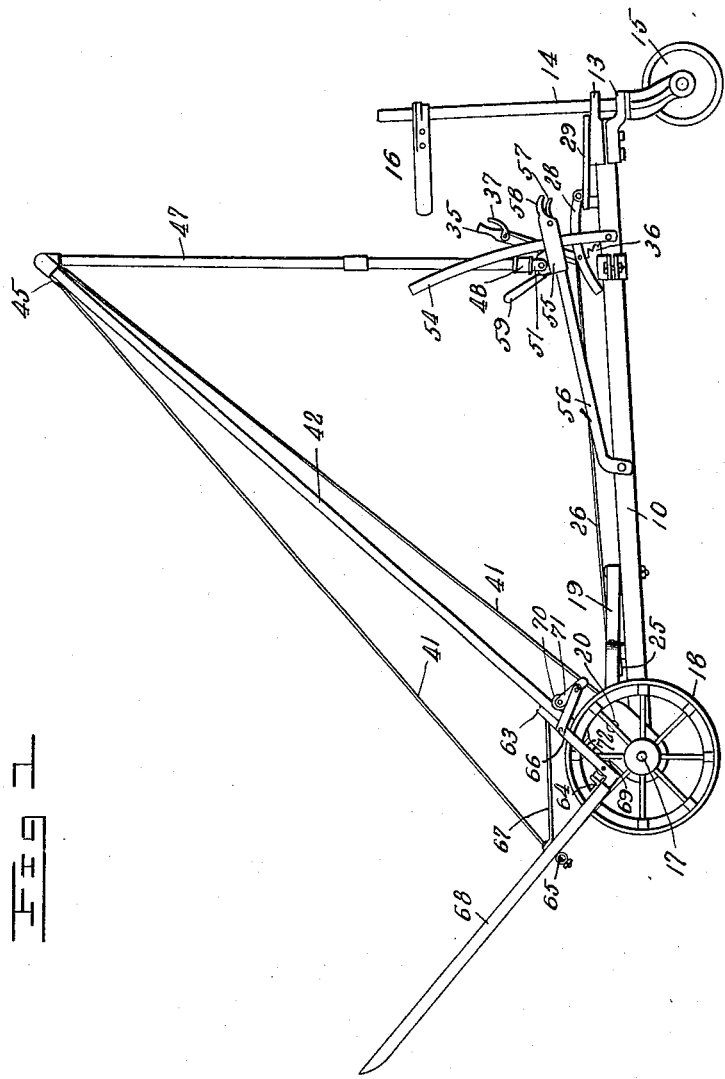
Witnesses
Inventor
Henry A. Goering
Solomon P. Krehbiel
By
Attorney H. A. GOERING & S. P. KREHBIEL.
HAY RAKE AND STACKER.
APPLICATION FILED OCT. 3, 1912.
1,146,244.
Patented July 13, 1915.
3 SHEETS—SHEET 2.
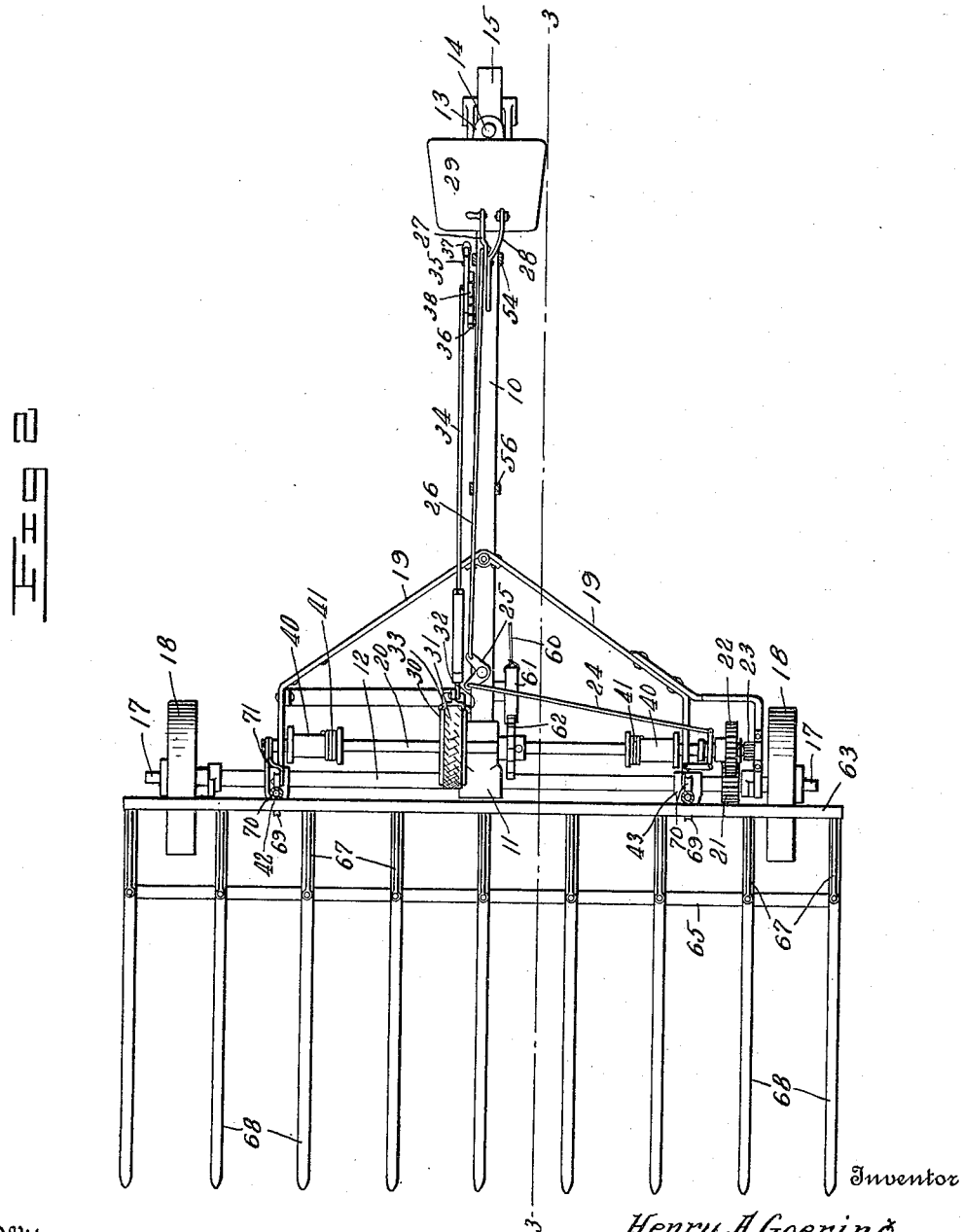

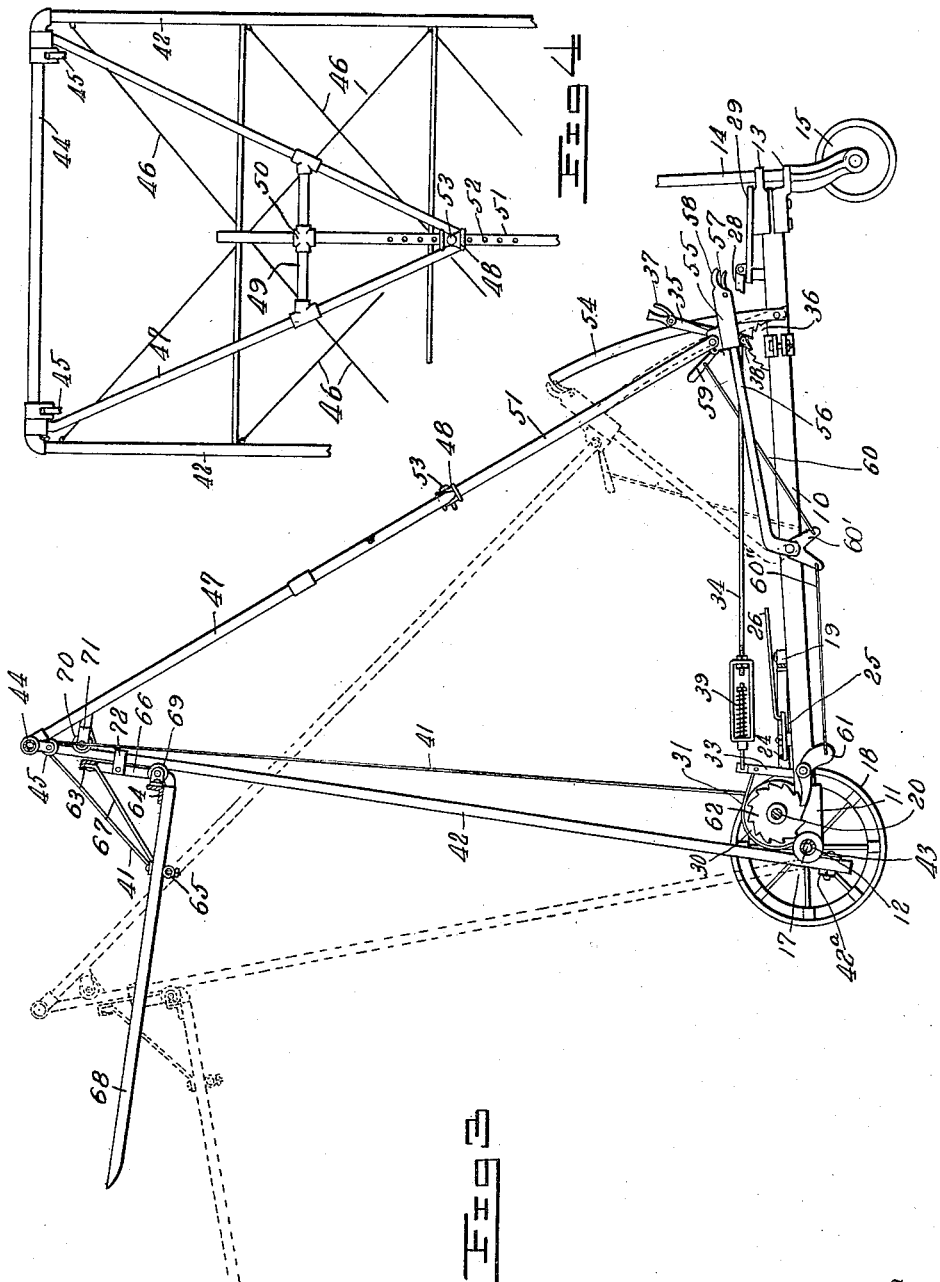

UNITED STATES PATENT OFFICE.

HENRY A. GOERING AND SOLOMON P. KREHBIEL, OF MOUNDRIDGE, KANSAS.

HAY RAKE AND STACKER.

1,146,244.  Specification of Letters Patent.  Patented July 13, 1915.

Application filed October 3, 1912. Serial No. 723,742.

*To all whom it may concern:*

Be it known that we, HENRY A. GOERING and SOLOMON P. KREHBIEL, citizens of the United States, residing at Moundridge, in the county of McPherson and State of Kansas, have invented new and useful Improvements in Hay Rakes and Stackers, of which the following is a specification.

This invention relates to hay rakes and stackers, and has for its principal object to simplify the construction of such devices and to provide a structure capable of such adjustments as to enable the more ready handling of this machine, both in operation and in conveying the machine from place to place, than machines heretofore devised and constructed.

Another object of this invention is to peculiarly group the elements of a machine of this character to produce a device which is relatively narrow whereby the machine may be conveniently conveyed through gates and like narrow passages and may be easily housed when not in use, the machine having in addition to these advantages all the advantages of other machines in capacity and strength.

The invention also designs to provide a machine with an upright frame or derrick which is adjustable and which may be folded down to a considerable extent to admit the passage of the machine beneath relatively low obstructions, such as gate cross pieces, telephone and like wires, roofs of barns, and the like.

The invention, in general, designs to provide a machine capable of such adjustments as to enable the handling of the machine under practically all conditions, a feature which has been found lacking in prior devices.

This invention has for a further object to produce a machine having a frame of simple construction which is light in weight, strong, durable, and which will admit of the positioning of the draft animals close together and directly in front of the driver so that they may be easily controlled, and a frame which may be guided in its movements by the operator from the seat, thus placing the frame under the direct control of the driver, and not, as has been heretofore done, under the indirect control of the driver by guiding the draft animals.

A still further object of this invention is to combine with the rake-raising and releasing mechanism a tension and brake device which will hold the rake in raised position while releasing the rake from the driving mechanism, and which will lower the rake at any speed desired, all of such mechanism and devices being controllable by the driver from the seat.

Other objects and advantages of this invention will be apparent from the following specification disclosing in detail the present embodiment of this invention, and in the accompanying drawing illustrating such embodiment.

In the drawings: Figure 1 is a side elevation of the improved machine adjusted for conveying from place to place. Fig. 2 is a top plan view of the same, parts thereof being broken away. Fig. 3 is a longitudinal sectional view of the machine taken on the line 3—3 of Fig. 2. Fig. 4 is a detail enlarged view of the derrick brace.

Referring to the drawings, in which like parts are designated by similar reference characters throughout the several views, it will first be noted that the machine in general, is made up of a main frame or carriage, a derrick on the carriage, a brace for the derrick and an adjustable rake mounted on the derrick.

The frame of the machine is preferably of T-form and comprises a push beam 10 of tubular construction secured at its forward end by a casting 11 to a tubular axle casing 12. The rear end of the push beam 10 carries a bearing 13 in which is vertically mounted a forked crank arm 14 depending from the bearing 13 and carrying in its lower end a supporting wheel 15. The crank arm 14 extends up through the bearing 13 and is provided upon its upper end with a seat 16 projecting forwardly therefrom and adapted to control the turning of the crank arm 14. In the tubular axle casing 12 is mounted a front axle 17 upon the ends of which are fixed wheels 18 supporting the forward end of the frame. The push beam 10 is reinforced by a pair of diagonal braces 19 extending from the ends of the tubular casing 12 back and inward to the push beam, and are secured to a common point upon the push beam slightly rearward of the casting 11. A jack shaft 20 is journaled in the frame and is connected to the front axle 17 by intermeshing gears 21 and 22 respectively mounted upon the axle and the jack shaft. The gear 22 is loose upon the jack shaft and coöperates with a clutch sleeve 23 fixed upon the jack shaft outwardly of the gear to effect a turning of the jack shaft 20 when the clutch 23 is moved into engagement with the teeth of the gear 22. The gear 22 has suitable connection with one end of a connecting rod 24, the latter extending inwardly to the push beam 10 where it is hinged at the opposite end to one arm of a bell-crank lever 25 pivoted upon the push beam 10. The opposite arm of the bell-crank lever 25 has hinged connection with a second rod 26 extending longitudinally of the push beam toward the rear end thereof where the rod 26 has hinged connection with an operating and locking lever 27 pivoted upon a supporting bar 28. The supporting bar 28 may be of any adaptable form, but is disclosed in the present instance as being substantially arcuate in form and having one end supported upon the push beam 10 and its opposite end secured to a platform 29 mounted upon the bearing 13. The lever 27 is hinged to and at a point intermediate the ends of the bar 28 and slightly above the plane of the platform 29. The lever 27 is hinged to the rod 26 adjacent its fulcrum and is adapted to extend down and back and rest upon the platform 29 to lock the rod 26 from forward movement. When in this position, disclosed in Fig. 2, the lever 27 holds the clutch sleeve 23 in released position and prevents the accidental engagement of the sleeve 23 with the lateral teeth of the gear 22.

The jack shaft 20 is provided with a brake drum 30, disclosed as located midway between the ends of the jack shaft and at one side of the push beam 10. This drum is provided with a brake band 31 having one end secured to a cross-piece 32 carried upon the forward end of the push beam 10 and projecting laterally therefrom, the opposite end of the brake band 31 being secured in the upper end of a lever 33 hinged at its lower end upon the cross-piece 32. A two-piece connecting rod 34 is secured at one end to the upper extremity of the lever 33 and has its opposite end hinged upon a hand lever 35 pivoted upon one side of the push beam 10 concentric to a segment 36. The hand lever 35 carries a thumb latch 37 connected in the usual way to a dog 38 engaging the segment 36 and adapted to lock the hand lever 35 in the desired adjusted position. The portions of the rod 34 are suitably connected together by means of a spring 39 effecting a yielding engagement of the brake band 31 upon the drum 30. The jack shaft 20 carries near its opposite ends a pair of drums 40 adapted to be rotated by the jack shaft and having wound thereon cables or ropes 41 for raising and lowering the rake hereinafter set forth.

The derrick which is mounted upon the frame or carriage comprises a pair of posts 42 hinged at their lower ends against the tubular casing 12 by straps 43 passing around the tubular casing 12 and secured to the lower ends of the posts 42 by bolts, or the like. The posts 42 extend upward in parallelism and are held apart by cross-pieces 44, the uppermost one of which carries adjacent the posts 42 sheaves 45 over which the ropes or cables 41 are passed. The derrick is reinforced by a plurality of transverse or diagonal braces 46 comprising, preferably, wires sufficiently strong to brace the derrick. This derrick is adapted to swing forward and rearward, and is supported in the desired position by a brace. This brace comprises a pair of bars 47 hinged at their upper ends upon the uppermost cross-piece 44 of the derrick, the lower ends of the bars converging and being secured to a sleeve 48. The bars 47 are reinforced by a transverse rod 49 located intermediate the ends of the rods 47 and being provided with a second sleeve 50 in longitudinal alinement with the sleeve 48. A connecting bar 51 is slidably mounted in the sleeves 48 and 50 and is provided with a number of transverse openings 52 registering one at a time with a transverse opening in the sleeve 48 through which passes a key or pin 53 employed for locking the connecting bar 51 in the sleeves when properly adjusted. The push beam 10 is provided near its rear end, immediately forward of the platform 29, with a guiding bar 54 upon which is slidably mounted a block 55 having hinged connection with the lower end of the connecting bar 51. The guiding bar 54 is pivoted upon the push beam 10, and the block 55 is guided in its up and down movements by a radius rod 56 hinged upon the block 55 at one end and at its opposite end upon the push beam 10 at a point forward of the guiding bar 54. A latch 57 is carried upon the block and adapted for locking the block upon the bar 54 when raised to the desired height. The latch 57 has a finger-engaging portion projecting rearwardly adjacent to the handle 58 for raising and lowering the block. Mounted upon the block 55 is a handle 59 to which is attached a cord 60 extending forwardly to a bell crank 60' hinged upon the push beam 10 concentric with the radius rod 56 and having attachment with one arm of the bell crank. Another section of cord 60'' connects the opposite arm of the bell crank with the weighted lower end of a latch 61 pivoted against the side of the push beam 10 in the path of a ratchet wheel 62 fixed upon the jack shaft 20. The latch 61 automatically engages the teeth of the ratchet 62 and locks the jack shaft 20 from rotating in a reverse direction after the cables have been wound upon the drums.

The rake employed in connection with this machine comprises three cross-heads 63, 64 and 65 arranged in triangular relation. The upper cross-head 63 and the inner cross-head 64 are held in superposed spaced relation by supports 66 arranged vertically between the cross-heads, the cross-heads 63 and 65 being connected together by truss braces 67. The truss braces 67 extend downwardly diagonally from the upper cross-head 63 to the lower forward cross-head 65, and support a plurality of rake teeth 68 extending forward from the lower cross-heads 64 and 65. Grooved pulleys 69 are mounted upon the rake at the opposite ends of the cross-head 64 and rest against and move over the outer faces of the posts 42, which are preferably circular in cross-section. A second pair of grooved pulleys 70 are mounted in arms 71 extending rearwardly about the sides of the posts 42, the pulleys 70 engaging the rear faces of the posts 42 and holding the rake from tilting forward and downward. A pair of fingers 72 are carried upon the ends of the rake and extend backward about the sides of the posts 42 and are curved laterally to engage the rear faces of the posts and hold the rake from tilting upward. The cables or ropes 41 which pass over the sheaves 45 are brought down and secured to the rake.

In operation the draft animals are attached to the frame at the opposite sides of the push beam 10 and immediately in front of the platform 29. When the machine is being conveyed from place to place, the block 55 is moved into its lowermost position upon the guiding bar 54. The key or pin 53 is withdrawn from the sleeve 48 and the upper portion of the derrick brace is moved down upon the connecting bar 51 into the position shown in Fig. 1. It will be noted that this double adjustment of the derrick brace throws the derrick backward into a relatively low position so that the machine may pass under relatively lower obstructions. As the machine is pushed along by the draft animals the operator guides the machine directly by turning the crank arm 14.

When it is desired to pick up a quantity of hay, the derrick is raised into the position disclosed in Fig. 3, the latch 61 is released from the ratchet 62 and the jack shaft 20 is released and caused to turn in a reverse direction by the weight of the rake supported upon the ropes 41. The operator, however, controls the descent of the rake with the lever 35 with which the operator contracts the brake band 31 upon the drum 30 and prevents the overrunning of the shaft 20. The machine is now moved forwardly with the rake in its lowermost position and with the teeth projecting forwardly near the ground. The hay is now taken up by the rake, the operator adjusts the block 55 to slant the derrick backward slightly to retain the load upon the rake, and throws the lever 27 forwardly whereupon the gear 22 is moved into engagement with the clutch sleeve 23 and the shaft 20 is thereby coupled to the axle 17. The forward movement of the frame now rotates the jack shaft and winds the ropes 41 upon the drums 40. The winding of the ropes 41 raises the rake into the position disclosed in Fig. 3. The machine is now carried to the stack and the load upon the rake is dropped upon the top of the stack by lowering the rake and backing the machine away from the stack.

It will be noted from Fig. 2 of the drawings that the rake is so constructed as to extend laterally beyond the wheels of the carriage or frame. To this end, the lower cross-head 64 is shorter than the cross-heads 63 and 65 to provide an uninterrupted passage for the wheel at each end of the rake between the inner ends of the teeth 68 located at the opposite sides of the rake. The endmost braces 66 are arranged for movement in a plane outwardly of the plane of the wheels so that when the rake is in lowered position its outermost braces 66 overlap the wheels and form continuations of the rake beyond the wheels. In this manner, the rake is of a construction which is relatively wide so that the entire width of the machine may be taken up by the rake and the supporting wheels and other mechanism are disposed inwardly of the ends of the rake. With this construction, a rake of ordinary size may be used while the mechanism which supports and operates the rake is of less width than the rake, thereby admitting of the passage of the entire machine through practically any space through which the rake may pass.

The posts 42 extend down in front of the housing 12 to a point near the ground so as to admit of the lowering of the rake into close proximity to the ground. The posts 42 are provided with a pair of rests 42ª projecting forwardly from their lower ends upon which the rake rests when lowered, and which serve as stops to prevent the dropping of the rake from the derrick.

It will, of course be understood that various structural, and other minor changes may be made in the details of this embodiment of the invention, provided that such changes be within the scope of the following claim. By the provision of the radius rod 56 and the adjacent parts the frame may be tilted forwardly a sufficient extent to dump the load upon the fork without lowering the fork. The machine may pass through any gate which is of sufficient width to allow the running frame and wheels of the device to pass through, since if the gate is too narrow to let the fork pass through, the fork may be raised to clear the top of the gate when the running frame may pass through without hindrance.

What we claim is:

In a device as specified; the combination with a frame; a derrick on the frame; a rake on the derrick; means for hoisting the rake on the derrick; and derrick tilting means on the frame; of a support between the derrick and the tilting mechanism, and comprising a pair of relatively adjustable sections secured respectively to the derrick and said mechanism; the section of said support secured to said derrick comprising a pair of arms hinged upon the upper end of the derrick and converging downwardly, a sleeve joining the lower ends of said arms, a transverse rod secured across the arms intermediate their ends, and a second sleeve mounted on said transverse rod in longitudinal alinement with said first sleeve; the other of said sections comprising a rod slidably engaging through said sleeve; means for securing said members in any one of a number of predetermined extended positions whereby to support the derrick in an upright working position; and means for supporting said section in collapsed position whereby to hold the derrick in lowered inoperative position.

In testimony whereof we have hereunto set our hands in presence of two subscribing witnesses.

HENRY A. GOERING.
SOLMON P. KREHBIEL.

Witnesses:
HENRY J. VETTER,
DAVID J. GOERING.

Copies of this patent may be obtained for five cents each, by addressing the "Commissioner of Patents, Washington, D. C."